United States Patent
Gschwind et al.

(10) Patent No.: US 7,200,840 B2
(45) Date of Patent: Apr. 3, 2007

(54) METHOD AND APPARATUS FOR ENABLING ACCESS TO GLOBAL DATA BY A PLURALITY OF CODES IN AN INTEGRATED EXECUTABLE FOR A HETEROGENEOUS ARCHITECTURE

(75) Inventors: Michael Karl Gschwind, Chappaqua, NY (US); Kathryn M. O'Brien, South Salem, NY (US); John Kevin O'Brien, South Salem, NY (US); Valentina Salapura, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 116 days.

(21) Appl. No.: 10/280,187

(22) Filed: Oct. 24, 2002

(65) Prior Publication Data

US 2004/0083342 A1    Apr. 29, 2004

(51) Int. Cl.
*G06F 9/45* (2006.01)
(52) U.S. Cl. ............... 717/147; 717/149; 711/206
(58) Field of Classification Search ............. 711/147; 719/332
See application file for complete search history.

(56) References Cited

U.S. PATENT DOCUMENTS

| | | | |
|---|---|---|---|
| 4,882,674 A | 11/1989 | Quint et al. | |
| 5,339,430 A * | 8/1994 | Lundin et al. | 719/332 |
| 5,659,701 A | 8/1997 | Amit et al. | |
| 5,664,159 A | 9/1997 | Richter et al. | |
| 5,684,955 A | 11/1997 | Meyer et al. | |
| 5,761,137 A * | 6/1998 | Johnson et al. | 365/193 |
| 5,812,848 A | 9/1998 | Cohen | |
| 5,960,466 A | 9/1999 | Belgard | |
| 6,006,248 A | 12/1999 | Nagae | |
| 6,077,312 A | 6/2000 | Bates et al. | |
| 6,119,247 A | 9/2000 | House et al. | |
| 6,138,209 A | 10/2000 | Krolak et al. | |
| 6,145,119 A | 11/2000 | House et al. | |
| 6,157,960 A | 12/2000 | Kaminsky et al. | |
| 6,202,200 B1 | 3/2001 | House et al. | |
| 6,209,061 B1 | 3/2001 | Nelson et al. | |
| 6,219,803 B1 | 4/2001 | Casella et al. | |
| 6,427,234 B1 | 7/2002 | Chambers et al. | |
| 6,430,600 B1 * | 8/2002 | Yokote | 709/203 |
| 6,446,137 B1 | 9/2002 | Vasudevan et al. | |

(Continued)

OTHER PUBLICATIONS

Implementing a component architecture on multiple distributed object frameworks☐☐Ben-Shaul, I.; Gish, J.W.; Robinson, W.; Enterprise Distributed Object Computing Workshop, 1998. EDOC '98. Proceedings. Second International , Nov. 3-5, 1998; pp. 319-329.*

(Continued)

*Primary Examiner*—Brian R. Peugh
(74) *Attorney, Agent, or Firm*—Carr LLP; Diana R. Gerhardt (57) ABSTRACT

In the present invention, global information is passed from a first execution environment to a second execution environment, wherein both the first and second processor units comprise separate memories. The global variable is transferred through the invocation of a memory flow controller by a stub function. The global descriptor has a plurality of field indicia that allow a binder to link separate object files bound to the first and second execution environments.

14 Claims, 5 Drawing Sheets

U.S. PATENT DOCUMENTS

| | | | |
|---|---|---|---|
| 6,480,818 | B1 | 11/2002 | Alverson et al. |
| 6,671,746 | B1 * | 12/2003 | Northrup .................... 719/331 |
| 6,704,842 | B1 * | 3/2004 | Janakiraman et al. ....... 711/141 |
| 6,735,601 | B1 | 5/2004 | Subrahmanyam |
| 6,738,977 | B1 * | 5/2004 | Berry et al. ................ 719/332 |
| 6,760,907 | B2 | 7/2004 | Shaylor |
| 6,779,049 | B2 * | 8/2004 | Altman et al. ................ 710/22 |
| 2002/0078308 | A1 | 6/2002 | Altman et al. |
| 2002/0144241 | A1 | 10/2002 | Lueh |
| 2004/0205697 | A1 | 10/2004 | Hylands et al. |

OTHER PUBLICATIONS

Experience with secure multi-processing in Java☐☐Balfanz, D.; Li Gong; Distributed Computing Systems, 1998. Proceedings. 18th International Conference on , May 26-29, 1998 ☐☐pp. 398-405.*

Orr et al., "OMOS—An Object Server for Program Execution", © 1992, IEEE, p. 200-209.*

"Chapter 7: Linking", © 1998 Micro Focus Limited, p. 1-11.*

Winner, "Naming and Binding in a Vertical Migration Environment", © 1988 IEEE, p. 599-607.*

A toolkit for detecting and analyzing malicious software—Weber, M.; Schatz, M.; Geyer, D.; Computer Security Applications Conference, 2002. Proceedings. 18th Annual, Dec. 9-13, 2002; pp. 423-431.

Debugging protocol for remote cross development environment—Seungwoo Son; Chaedeok Lim; Neung-Nam Kim; Real-Time Computing Systems and Applications, 2000. Proceedings. Seventh International Conference on, Dec. 12-14, 2000; pp. 394-398.

Reflections on remote reflection—Richmond, M.; Noble, J.; Computer Science Conference, 2001. ACSC 2001. Proceedings. 24th Australasian, Jan. 29-Feb. 4, 2001; pp. 163-170.

Tanenbaum, "Structured Computer Organization", 1984, Prentice-Hall, Inc., p. 10-12.

* cited by examiner

FIRST FILE-PROGRAM to be run on an MPU

```
struct triangles[512]figure;
struct light[16] illumination;
struct transformedAndLitTriangles[512] litFigure;
float worldViewTransform[4] [4];

drawFigure()    {
    int apuNumber;// the APU that is to be used
    // transformAndLightFigure();
    apuNumber=assignAPU();// APU is assigned to program
    moveToAPU(apuNumber, figure, APU_figure, sizeof(figure));// use size to get the length
    moveToAPU(apuNumber, illumination,_APU_illumination,_length_illumination);// use length symbol
    moveToAPU(apuNumber,_MPU_APU_TL,_APU_APU_TL,_Length_APU_TL);
    startAPUExeution(APUNumber);
    waitForAPUCompletion(APUNumber);
    getFromAPU(APUNumber,_APU_litFigure, litFigure, sizeof(litFigure);
    displayFigure();
};

displayFigure() {
    int i;
    for(i=0; i<512; i++)
        moveToRealizer(litFigure[i]);
};
```

*FIG. 4B*

SECOND FILE--PROGRAM to be run on an APU
===

```
extern struct triangles[512] figure;
extern struct light[16] illumination;
extern struct transformedAndLitTriangles[512] litFigure;
extern float worldViewTransform[4] [4];

transformAndLightFigure() {
    int i;

getFromSystemMemory(worldViewTransform,_Mpu_worldviewTransform, sizeof(worldViewTransform));

for(i=0; i<512; i=++) {
        applyTransform(transformedAndLitTriangles[i], worldViewTransform, figure[i]);
        computeColor(transformedAndLitTriangles[i], illumination);
    }
}
```

FIG. 5

METHOD AND APPARATUS FOR ENABLING ACCESS TO GLOBAL DATA BY A PLURALITY OF CODES IN AN INTEGRATED EXECUTABLE FOR A HETEROGENEOUS ARCHITECTURE

CROSS-REFERENCE TO RELATED APPLICATIONS

This application relates to co-pending U.S. patent applications entitled "METHOD AND APPARATUS FOR SETTING BREAKPOINTS WHEN DEBUGGING INTEGRATED EXECUTABLES IN A HETEROGENEOUS ARCHITECTURE" Ser. No. 10/280,677, "METHOD AND APPARATUS FOR OVERLAY MANAGEMENT WITHIN AN INTEGRATED EXECUTABLE FOR A HETEROGENEOUS ARCHITECTURE" Ser. No. 10/280,242 "METHOD AND APPARATUS FOR MAPPING DEBUGGING INFORMATION WHEN DEBUGGING INTEGRATED EXECUTABLES IN A HETEROGENEOUS ARCHITECTURE" Ser. No. 10/280,243 and "METHOD AND APPARATUS FOR CREATING AND EXECUTING INTEGRATED EXECUTABLES IN A HETEROGENEOUS ARCHITECTURE Ser. No. 10/280,244, filed concurrently herewith and having the same inventors, Michael Karl Gschwind, Kathryn O'Brien, John Kevin O'Brien, and Valentina Salapura.

TECHNICAL FIELD

The invention relates generally to multiprocessing and, more particularly, to the linking of global variables between a plurality of processors.

BACKGROUND

Parallel processing, which generally comprises employing a plurality of microprocessors coupled to the same system to concurrently process a batch of data, is of great importance in the computer industry. Generally, there are three major types of parallel processing. These are parallel processing systems employing shared memory or distributed memory or a combination of the two. Typically, shared memory is memory that can be accessed in a single operation, such as a "load" or "read" command, by a plurality of processors. Distributed memory is memory that is localized to an individual processor. In other words, each processor can access its own associated memory in single access operation, but typically cannot access memories associated with other processors in a single operation. Finally, there is a hybrid, or "heterogeneous", parallel processing, in which there is some shared memory and some memory which is distributed.

One such example of a hybrid parallel processor system comprises a reduced instruction set (RISC) main processor unit (MPU), such as a PowerPC™ processor, and a specialized, or "attached" processor (APU), such as a Synergistic™ APU (SPU). Typically, the MPU is employed to execute general-purpose code, wherein the general-purpose code comprises complex control flows and orchestrating the overall hybrid parallel processing function. The MPU has access to the full range of system memory. Although in one embodiment, only one MPU is used, in other embodiments, more than one MPU is used. The APU is generally directed to executing dataflow operations. In other words, the APU calculates highly repetitive multimedia, graphics, signal, or network processing workloads, which are identified by high compute to control decision ratios. In conventional hybrid systems, APUs do not have access to the system memory, and their own memory, the local store, is typically smaller than the shared memory.

Generally, while employment of the hybrid system provides high computational performance, it poses significant challenges to the programming model. One such problem relates to the APU. The APU cannot directly address system memory. Therefore, any code to be run on the APU has to be transferred to an associated local storage of the APU before this code can be executed on the APU. Furthermore, the APU and the MPU can have different instruction sets.

In processing systems, such as hybrid processing systems, there is a need to transfer data between different components (for example, subroutines or functions) of the program. If these subroutines are designed to execute on a processor with direct access to the system memory, or are designed to execute entirely on a single processor within the heterogeneous computer system, conventional approaches of resolving the address of global data by a binder or linker functionality can be used. As is understood by those of skill in the art, global data is generally defined as data, which is referenced by a plurality of subroutines.

However, in the cases where communication of global data is required between subroutines executing on separate APUs, wherein the APUs have their own local store, or between a combination of one or more APUs and one or more MPUs, conventional linkage mechanisms are not capable of supporting the capacity of referencing global variables. In a conventional heterogeneous multi-processor system, there are several locations in which global data might reside, and these locations are not uniformly accessible from subroutines executing on the different processors within the system. However, an integrated executable program will typically need to access such global variables from more than one of the different processors within the system.

Therefore, there is a need to access global variables in a hybrid parallel processing system that overcomes the limitations of conventional systems.

SUMMARY

The present invention provides for transferring of global information in a parallel processor architecture between execution environments. The parallel architecture comprises at least one first execution environment, at least one second execution environment and a memory flow controller. The parallel processor architecture further comprises an information transfer function. The information transfer function is employable to command the memory flow controller to transfer the global information between the at least one first execution environment and the at least one second execution environment.

BRIEF DESCRIPTION OF THE DRAWINGS

For a more complete understanding of the present invention, and the advantages thereof, reference is now made to the following Detailed Description taken in conjunction with the accompanying drawings, in which.

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electromagnetic signaling techniques, and the like, have been omitted inasmuch as such details are not considered necessary to obtain a complete understanding of the present invention, and are considered to be within the understanding of persons of ordinary skill in the relevant art.

It is further noted that, unless indicated otherwise, all functions described herein may be performed in either hardware or software, or some combination thereof. In a preferred embodiment, however, the functions are performed by a processor, such as a computer or an electronic data processor, in accordance with code, such as computer program code, software, and/or integrated circuits that are coded to perform such functions, unless indicated otherwise.

Figure 1:
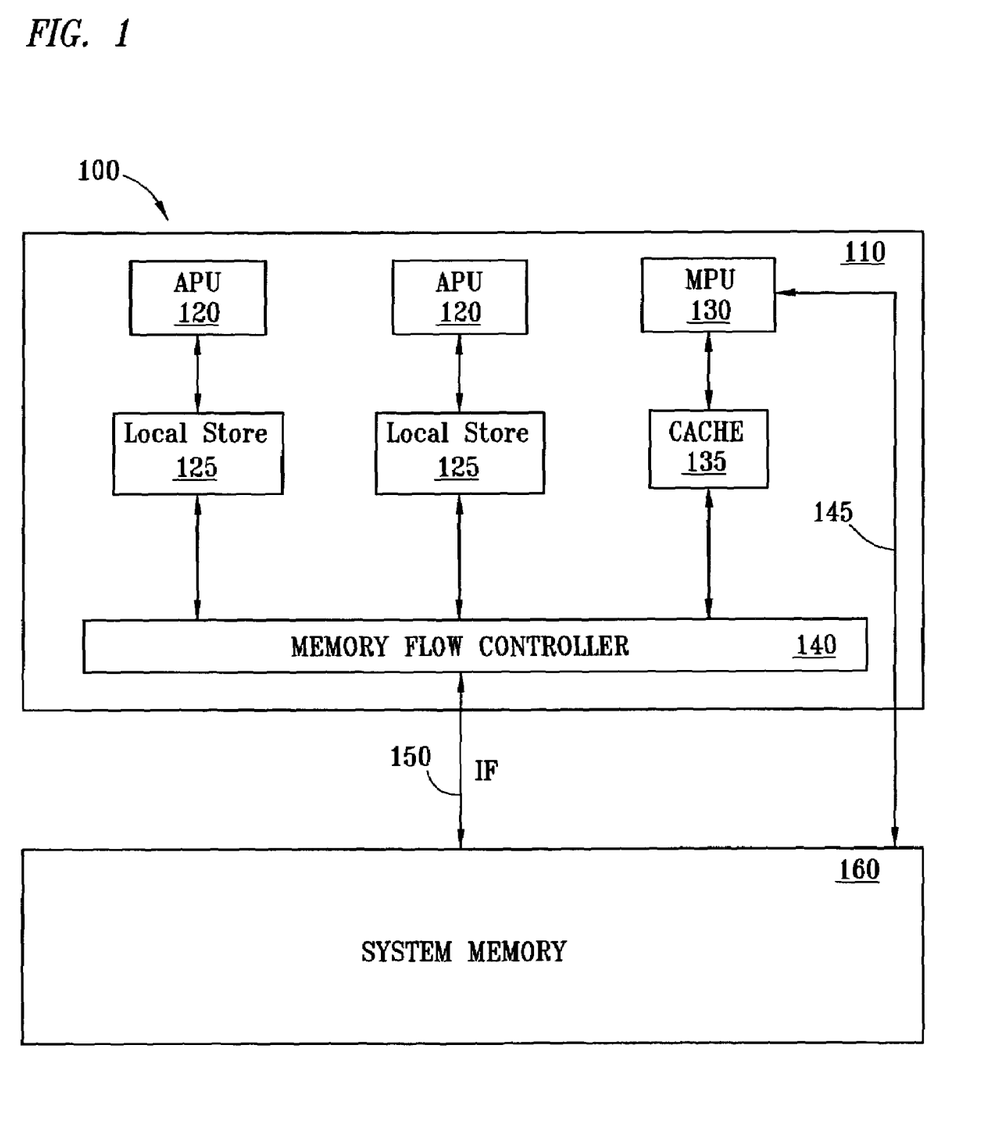
FIG. 1 schematically depicts a distributed processing system environment for the passing of global variables from a first execution environment to a second execution environment.

Referring to FIG. 1, the reference numeral 100 generally designates heterogeneous parallel processing architecture that provides an environment for enabling access to global data by a plurality of codes in an integrated executable. The architecture 100 comprises a distributed computing environment 110 and a system memory 160, both of which are electrically coupled by an interface 150. The environment 110 comprises a plurality of APUs 120, each with its respective local store 125. The environment 110 further comprises an MPU 130, such as an RISC processor, and its level one cache 135. In one embodiment, the MPU 130 is coupled to the system memory 160 through a signal path 145. In one embodiment, the attached processor comprises an SPU.

The environment 110 further comprises a memory flow controller (MFC) 140. Generally, the MFC 140 enables the movement of data and synchronization capability between the MPU 130 and the APU 120 processors, and provides for data transfer between the main system memory 160 and local storage 125. In FIG. 1, the MFC 140 is coupled to the system memory 160 through the interface 150.

Generally, the MFC 140 enables the movement of information, both text (that is, code) and data, between the system memory 160 and the local store 125 of the APU 120, at the request of the main processor 130 or the APU 120. Because the APU 120 does not have direct access to the system memory 160, the MFC 140 transfers information between the system memory 160 and the local store 125 of the APU 120 at the request of a transfer function, such as a stub function, running on either the APU 120 or the MPU 130. In one embodiment, the MFC 140 comprises a direct memory access (DMA) device.

The architecture 100 is an environment in which an executable program runs, wherein the executable program makes reference to global information, such as global variables. The executable program has a plurality of subroutines that transfer information associated with global variables to a first execution environment, such as the local store 125 of an APU 120, and at least one subroutine runs in a second execution environment, such as the system memory 160 coupled to the MPU 130. The APU 120 and the MPU 130 communicate with one another through employment of the MFC 140. The subroutines on the APU 120 and the MPU 130 transfer information through the access and employment of global information. In one embodiment, a single MPU 130 is employed. In a further embodiment, a plurality of MPUs 130 are employed.

In one embodiment, a linker is specifically adapted to produce integrated executables containing a linked information transfer function, such as a stub, or transfer subroutine, between two linked object files. In one embodiment, a linker is specifically adapted to produce integrated executables containing one or more linked information transfer functions, such as stubs or transfer routines capable of transferring the values of global variables, used in two or more object files, between the local store 125 and the system memory 160. Typically, each object file contains at least one reference to a global variable. The object file can contain multiple references. In one embodiment, the object files execute the stub function by means of a subroutine call or branch-and-link instruction. In another embodiment, a substitution of the transfer function inline at the point of reference of the global variable is made by the compiler.

Generally, the information transfer function, such as the stub function, commands the MFC 140 to transfer information between two separate execution environments, such as the system memory 160 and the local store 125. The information transfer function is employable to access and transfer global variables by both the APU 120 and the MPU 130. The linker takes the inserted, compiled information transfer function and generally binds the various modules together with the information transfer function, enabling access of the global information by the APU 120 and the MPU 130. Calls to the referenced data transfer function can be inserted either by a compiler or by a human programmer.

Figure 2:
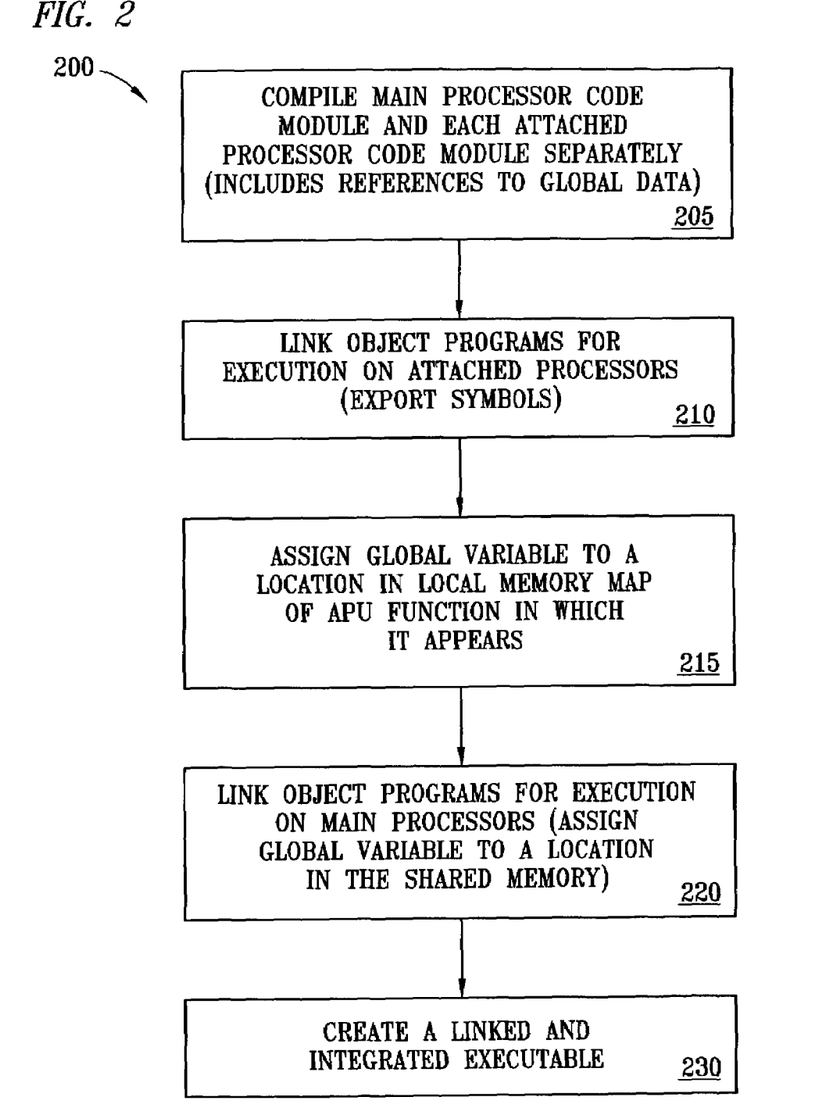
FIG. 2 illustrates a method for compiling and linking separate object modules into one integrated executable, wherein the integrated executable further comprises global variables accessible from the component linked object modules.

Turning now to FIG. 2, illustrated is a method 200 depicting steps to be performed by a binder/linker in creating an integrated executable program comprising global variables. Typically, data sections of integrated executables contain several types of program variables. These program variables are divided into such classes as text (code) and data. Furthermore, these program variables can be divided into local and global information. Typically, global information is employed to communicate values between different subroutines or objects of a program in the architecture 100.

In step 205, source modules written in a programming language, for example "C", "C++" or "Assembler," are compiled by a compiler to produce a plurality of separate object code modules tailored and targeted for execution on the plurality of separate execution environments of the architecture 100, such as the APU 120 or the MPU 130.

Generally, each of the compiled code modules destined for the APU 120 or the MPU 130 can be the result of the combination of code or data originating from several different compiled object files. Also, more than one executable section can include the same code or data. Typically, step 205 also combines into one contiguous area all the code or data which also can be loaded in one operation into the corresponding local store 125 of the selected APU 120. Examples of a module targeted to be run on the selected APU 120 is a trigonometric function, matrix manipulation, a square root calculation, and so on. Furthermore, step 205 combines any files to be compiled into an object module targeted to be executable on the MPU 130.

In step 210, the linker links the object code between a plurality of executive object files that resulted from step 205. These executable sections for employment by the APUs 120 will have both global and local data and code incorporated within. The linking of the global variables from APU code module to APU code module have been assigned, but the linking between the APU code modules and the MPU code modules have not been assigned.

Furthermore, in step 210, an external symbol dictionary is generated and modified. Generally, the external symbol dictionary corresponds to an identification between a global variable that is targeted for employment with an APU 120 and the same global variable that is targeted for the MPU 130. For instance, if the external symbol dictionary has entries for the variables "x" and "y" for a module targeted for processing on the MPU 130, the external symbol dictionary also has entries to be targeted on the APU 120. The global variables assigned to the APU 120 typically have an identifier that relates the global variables from the APU 120 to the MPU 130. For instance, the global variables "x" and "y" are indicated as "APU_x" and "APU_y", thereby allowing the linker to distinguish among the related variable names but still determine a global linking relationship between them.

In a step 215, the linker assigns each compiled global data and code a corresponding location in the memory map of the local store 125 corresponding to the targeted APU 120 module. The memory location of the system memory 160 is treated as the home location of the given global variable. Thereby allowing a home reference to a variable without overwriting the variable as it is stored in the APU 120.

In step 220, the linker links the object module or modules for execution on the APU 120 or APUs 120 to object module or modules targeted for execution on the MPU 130, thereby creating an integrated executable. These executable sections, targeted for employment by the APUs 120 and the MPU 130, will have both global and local data and code defined. An external name to properly link the global variables from module to module is assigned. Generally, an external name is an indicia visible to all of the subroutines bound within the integrated modules to help enable the passing of external variables. Finally, in step 230, the linked global memory access information of steps 215 and 220 is shared between the various modules, and a linked integrated executable is produced.

Figure 3:
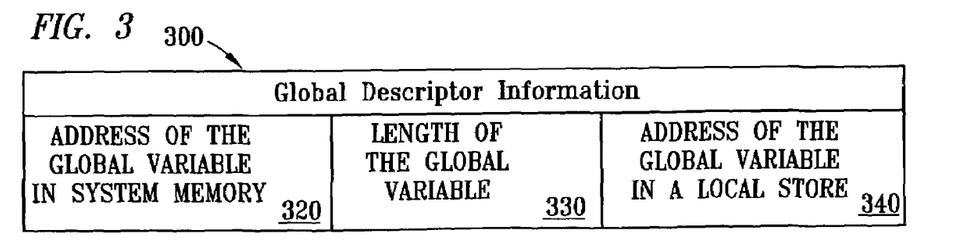
FIG. 3 schematically depicts parts of the descriptor of a global variable adapted to transfer global variables from a first execution environment to a second execution environment.

Turning now to FIG. 3, disclosed is global descriptor information 300. This descriptor is employable for the transference of global information between a first execution environment to a second execution environment, such as between the shared memory 160 to the local store 125. Typically, the global descriptor information 300 is used by a transfer function, such as a stub function, wherein the transfer function conveys a global variable from a first execution environment to a second execution environment, such as the system memory 160 to the local store 125. The global descriptor information 300 is constructed by the binder/linker.

Generally, the global descriptor information 300 is employed by the MFC 140 to pass information between the memory associated with a first processor to a memory associated with a second processor, such as between the system memory 160 and the local store 125. For example, with the global descriptor information 300, a global variable, such as "x" or an executable text section, could be passed from the system memory 160 to the local store 125 of a first APU 120, from the local store 125 to the system memory 160, or from the local store 125 of a first APU 120 to the local store 125 of a second APU 120. In one embodiment, this data transfer is performed at the request of a stub/transfer function.

To enable information transfers between the home location of the global variable in the system memory 160 and any of the attached local stores 125 corresponding to the target APU 120, the binder/linker employs several external names (not shown). Typically, the external names are visible to all the subroutines bound in the integrated module, including subroutines bound to separate execution environments.

In addition to the external name of the global information, which comprises indicia of the correct processor (such as a particular MPU 130 or APU 120), where the global descriptor is employed within the integrated executable, the binder/linker produces at least three other mapping indicia. These additional mapping indicia are the address of the global variable in system memory 320, the length of the global variable 330, and the address of the global variable in local storage 340. In a further embodiment, a plurality of addresses 340, one for each subroutine that is linked and targeted to the same APU 120, employ the same global information of a distinct descriptor, one for each external name of the descriptor information 300.

In a still further embodiment, where a plurality of addresses of local storage memory 340 are to be employed by the global descriptor information 300, an alternative would be to use a level of indirection, an array of address variables with one element for each attached-processor in the system. Employing an array of address variables would require functions to maintain the validity of these address variables.

In a still further embodiment, the length of the global variable 330 is not needed for data items, as contrasted to text or code items, since these lengths can be obtained by a computer programmer or a compiler by other means. However, when the data is a bound code section for execution on the APU 120, the length 330 is needed in the global descriptor 300.

Generally, the values of the fields 320, 330 and 340 can be used by a programmer to explicitly cause movement of data between a first and a second execution environment through employment of global information through directly specifying the names of the fields and of the desired indicia, or implicitly by using compiler provided built-in functions (that is, intrinsics) which will be expanded to the appropriate references.

Figure 4A:
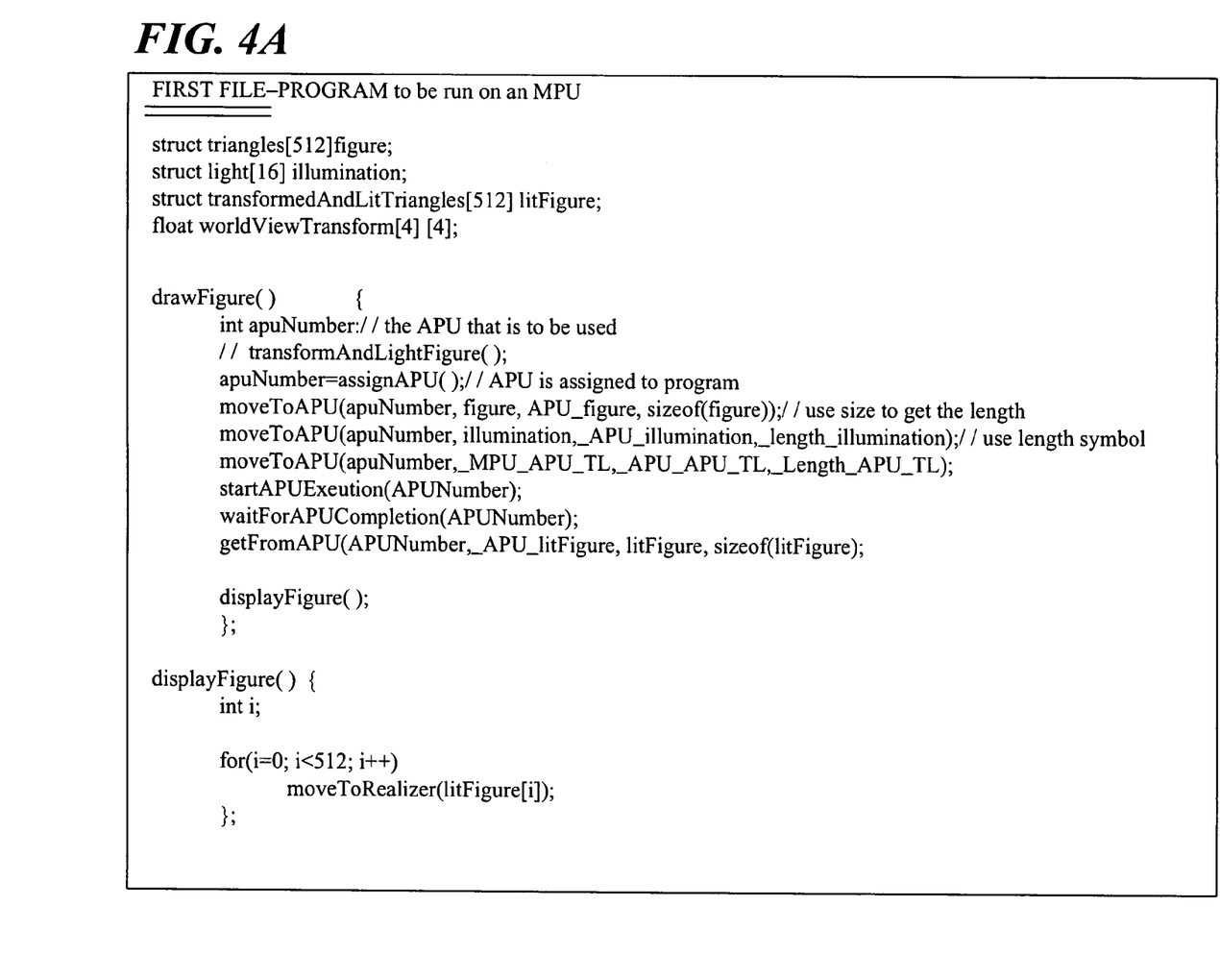
FIG. 4A depicts a pseudo-code function for sending a global variable from an APU to an MPU.
Figure 4B:
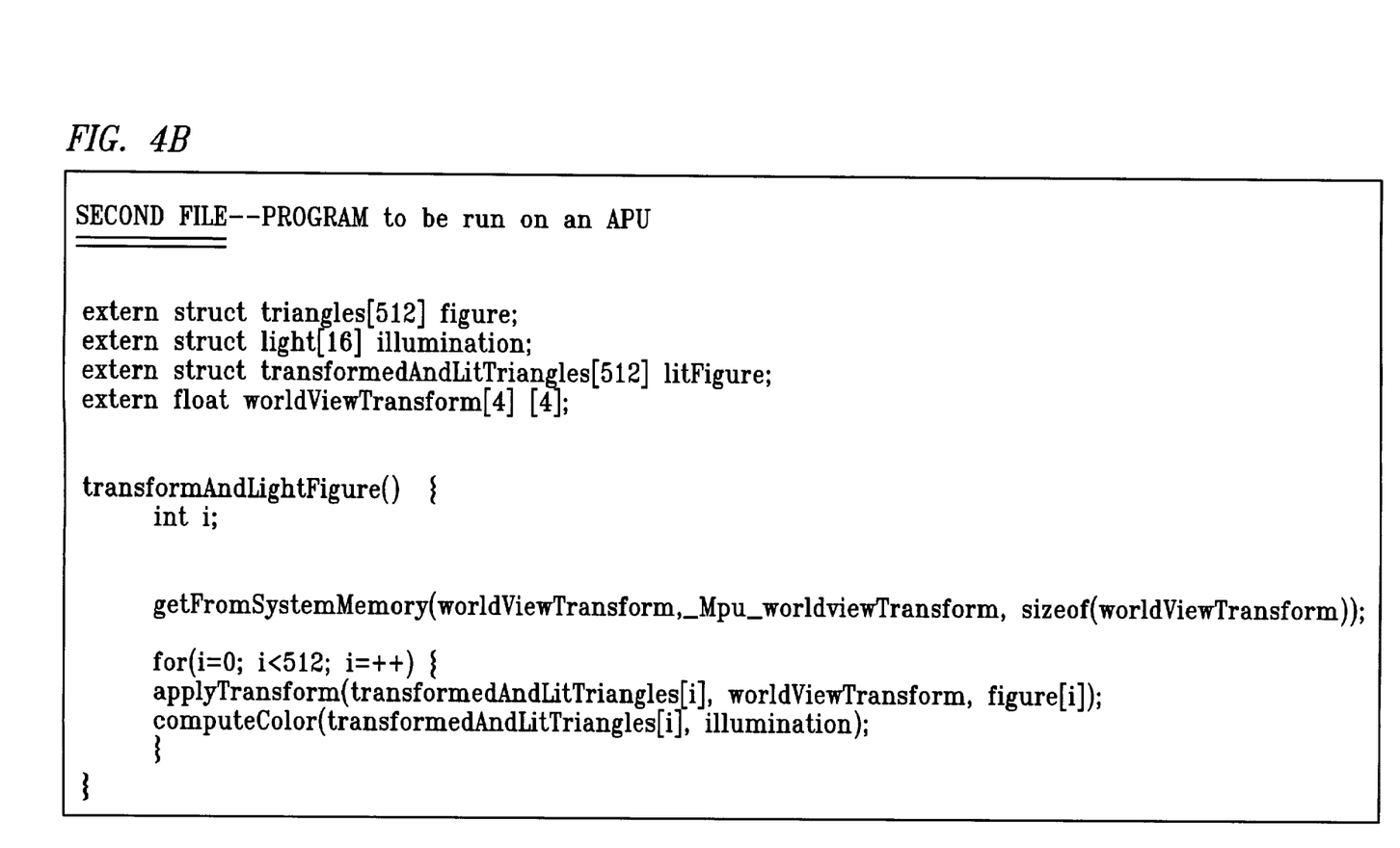
FIG. 4B depicts a pseudo-code function for sending a global variable from an MPU to an APU.

Turning now to FIG. 4A, disclosed is a "C" programming language pseudo-code object that transmits global information from the local store 125 of the APU 120 to the system memory 160. FIG. 4A generally discloses multiple global variables as employed in the environment 100 for employment with a "drawFigure( )" and "displayFigure( )" routine. The variables "figure," "illumination," "litFigure" and "worldViewTransform" are external, otherwise known as global, variables. As is understood by those of skill in the art, in FIG. 4A, because the variable declarations appear outside of any subroutine, the variable declarations are global and are located in the data section of this finale. Turning briefly to FIG. 4B, the keyword "external" indicates that the variables are global, and are not found in the data section of FIG. 4B. Turning once again to FIG. 4A, the global variables of FIG. 4A are associated with the system memory 160 of FIG. 1

The first file, FIG. 4A, is to execute in the MPU 130, and the second file, FIG. 4B, is to execute in the APU 120. Generally, FIGS. 4A and 4B disclose code that enables the transfer of code via transfer/stub functions between the MPU 130 and the APU 120. In one embodiment, the code is generated by a compiler, programmer, or produced by a compiler or other tool according some higher-level description written by the programmer.

In the environment 100, there are multiple memory locations that are not addressable from all the processors, such as the local stores 125. Therefore, the binder employed for the environment 100 has new functionality added to it. For each external variable, at least two addresses are now needed. One memory address corresponds to the global variable in the main memory 130 (generally corresponding to 320 of FIG. 3), and one for its potential address in a local store 125 (generally corresponding to 340 of FIG. 3). The binder allocates the memory space, so it knows both addresses. The memory address is stored in the external symbol dictionary entries in the object files. In one embodiment, the memory address is stored in the external symbol dictionary of the executable file.

In a further embodiment, for global variables, this is all the information that is required, because the length 330 can be calculated by the programmer. However, in a still further embodiment, the binder makes the length 330 generally available to another object file that is to reference it, using the length 330, as the program of FIG. 4B itself can be treated as a form of external/global data.

For the ease of illustration of FIGS. 4A and 4B, three address names are given. The first two names correspond directly to the required addresses. The third name is the actual global variable name, and its interpretation depends on the context (that is, its interpretation is equivalent to one or the other of the first two).

For instance, the three names correspond to the global variable "figure" of FIG. 4A. These are the _MPU_figure (the address in system memory 160 of figure, corresponding to 320 of FIG. 3), the _APU_figure (the address of the figure in local store 125, corresponding to 340 of FIG. 3). The variable "figure" comprises the equivalent to _MPU_figure in an APU procedure, or to an _APU_figure in an MPU procedure.

Similar logic can be extended to a global variable APU_TL, the address for a particular charge of the figure in the local store 125. Generally, a charge can be defined as a result of compiling a file, such as the second file and binding with the subroutines it calls. In this case of a charged file, the length 330 is also provided by the binder to the other object files that reference it. In the case of charges, the internal names are not directly derived from any external name in the program. Instead, the internal names are specified in the linking process by the programmer.

In one embodiment, the name APU_TL generally refers to a charge. In FIG. 4A, _MPU_APU_TL is the address in MPU memory 160 of this charge, _APU_APU_TL is the address in local store of this charge, and length_APU_TL is the length (or size) of the charge. In the illustrated embodiments of FIGS. 4A and 4B, all three input variables are transmitted from the MPU program to the APU program.

MPU_APU_TL generally corresponds to the address 320, the length_APU_TL generally corresponds to the length 330, and the APU_APU_TL generally corresponds to the address 340.

Figure 5:
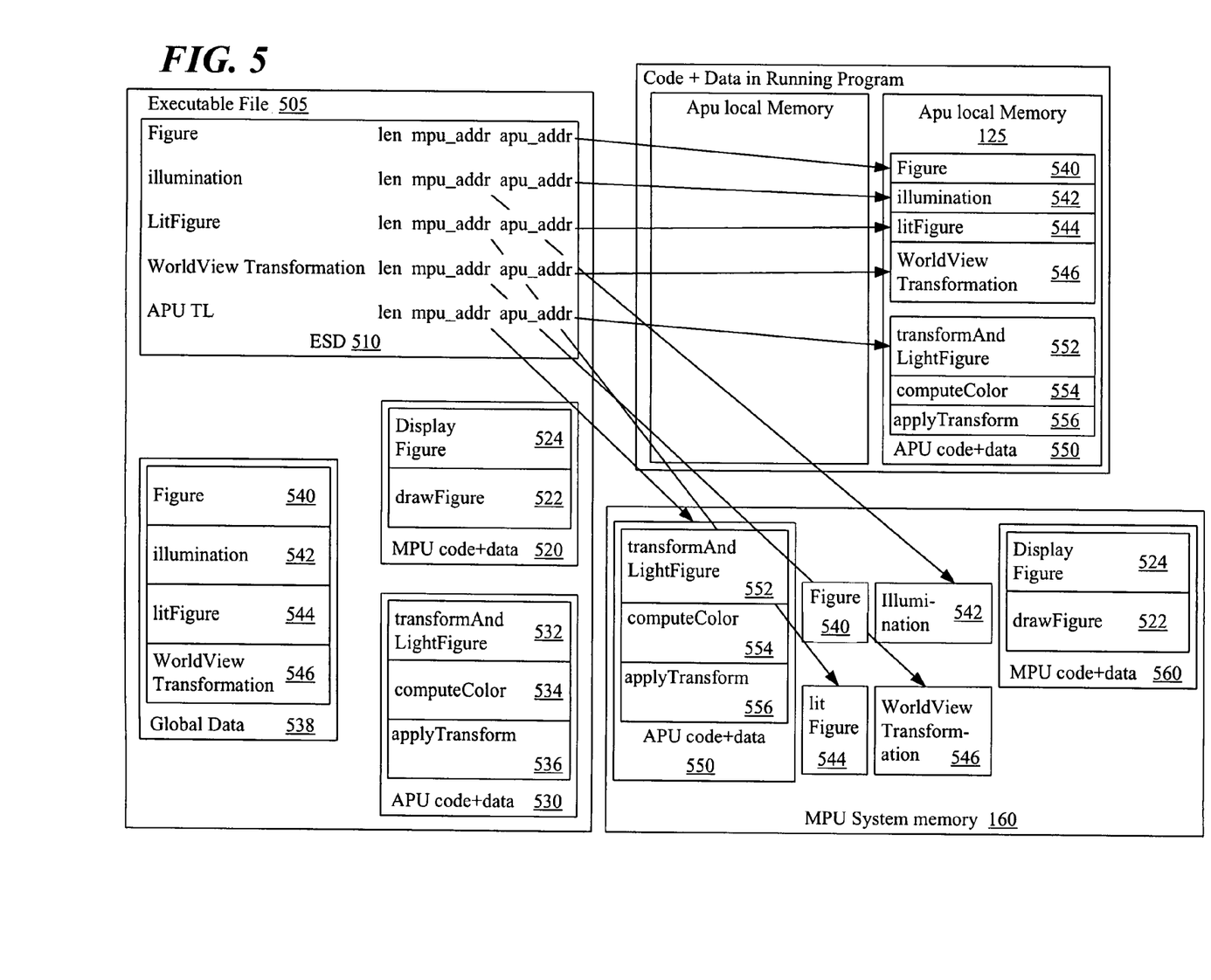
FIG. 5 schematically illustrates a correspondence between an integrated executable and the system memory and a local store.

Turning now to FIG. 5, schematically illustrated is one embodiment 500 of the correspondences between an integrated executable 505 comprising global data, and the location of the global data in the system memory 160 and the local store 125.

In FIG. 5, the integrated executable comprises an External Symbol Dictionary (ESD) 510. Generally, the ESD 510 is created during linking to allow separate modules having access to global data and an executable that is resident in the system memory 160, MPU code and data 520, to transmit information between them. The EDS 510 comprises the name of the global information and symbols to be shared between modules, such as "figure", "illumination", "litFigure", and so on.

The EDS 510 further comprises the length ("len") of each module and the address wherein the image of each module is to be stored in the system memory 160, the "MPU_addr". The EDS 510 further comprises the address wherein the image of each module is to be stored in the local store, the "APU_addr".

The integrated executable 505 comprises global data 538. Generally, global data is data that is accessible from a plurality of separate modules during run-time. In the illustrated embodiment, the global data 538 comprises global data "figure" 540, global variable illumination 542, the global variable litF*igure* 544, and the global variable worldViewTransformation 546. The contents of the global data 538 are referred to by a plurality of indicia. One indicia is the indicia employed by the MPU 130, and a second indicia is the indicia employed be the APU 120. For example, the global variable "figure" of FIG. 4A is referred to by a plurality of names. The binder links the two differently named variables together that refer to the same global variable. Both names and the linking information are stored in the ESD 510.

The integrated executable file 505 further comprises copies of the individual modules that will be stored in the system memory 160. In the illustrated embodiment, the MPU code and data 520 is stored in the MPU system memory 160. The MPU code and data 520 comprises the drawFigure symbol 522 and the displayFigure symbol 524. In the MPU code and data 520, the drawFigure symbol 522 and the displayFigure symbol 524 employs global data 538. In one embodiment, the drawFigure symbol 522 employs global data figure 540, and the displayFigure symbol 524 employs the global data litF*igure* 544, respectively.

The integrated executable 505 further comprises copies of at least one module that is employable be copied to the local store 125. In the illustrated embodiment, an APU code and data 530 is employable to be stored in the MPU system memory 160. The APU code and data 530 comprises the transformAndLightFigure symbol 532, the computecolor symbol 534 and the applyTransform 536. In one embodiment, the transformAndLightFigure symbol 532 employs the global variable worldview transformation 546.

The system memory 160 is also illustrated in FIG. 5. The system memory 160 contains an image of the modules to be transmitted to the local store 125, and the APU code and data 550. The symbol APU_TL is stored at memory position 550, and comprises the information and references of system memory module 530. Accordingly, APU code and data 550 comprises the transformAndLightFigure symbol 552, the computeColor symbol 554 and the applyTransform 556. The global data 538 is also stored in the system memory 160. These global variables, figure 540, illumination 542, litFigure 544, and worldViewTransformation 546, are modifiable by the MPU code and data 560, and ultimately by the code running in the local store 125.

FIGURE 500 further illustrates MPU code and data 560 for employment in the system memory 160. This is a copy of the MPU code and data 520 from the integrated executable 505. The MPU code and data 560 contains the symbol drawFigure 522 and displayFigure 524.

FIGURE 500 further illustrates the contents of the local store 125. In the illustrated embodiment, during run-time, the local store 125 has stored within copies of the global data 538. The local store 125 further has an executable APU code and data 550, which is a copy of the image. The executable APU code and data 550 can access the global data figure 540, illumination 542, litFigure 544, and worldViewTransformation 546.

It is understood that the present invention can take many forms and embodiments. Accordingly, several variations may be made in the foregoing without departing from the spirit or the scope of the invention. The capabilities outlined herein allow for the possibility of a variety of programming models. This disclosure should not be read as preferring any particular programming model, but is instead directed to the underlying mechanisms on which these programming models can be built.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

The invention claimed is:

1. A method for creating an integrated executable program, having at least one global information, to be executed on a system having at least two heterogeneous processors comprising a first processor and a second processor, and at least two separate execution environments comprising a first execution environment and a second execution environment, comprising the steps of:
    separately compiling a plurality of source code modules, each intended to be executed on one of either the first execution environment or the second execution environment, wherein at least two modules of the plurality of source code modules reference the at least one global information, the compiling creating separate object code modules;
    assigning the at least one global information to a first address in the first execution environment, wherein at least one processor of the at least two heterogeneous processors cannot address the first execution environment;
    assigning the at least one global information to a second address in the second execution environment, wherein the first and second addresses are different;
    generating an external symbol dictionary to map the first address to the second address, wherein the external symbol dictionary comprises an indicia of the global information, the first address of the first execution environment, and the second address of the second execution environment; and
    linking the object code modules and the external symbol dictionary to create an integrated executable program.

2. The method of claim 1, wherein an indicia of the first address comprises an identifier of the first processor and the first address, and an indicia of the second address comprises an identifier of the second processor and the second address.

3. The method of claim 1 further comprising storing a copy of the external symbol dictionary in the first execution environment and the second execution environment.

4. The method of claim 1 further comprising storing a copy of the object code modules intended to be executed by the first processor in the first execution environment, and a copy of the object code modules intended to be executed by the second processor in the second execution environment.

5. The method of claim 1, wherein the external symbol dictionary comprises only a name, the first address, and the second address.

6. The method of claim 1, wherein the external symbol dictionary comprises only a length of the at least one global information, a name, the first address, and the second address.

7. A method for mapping at least one global information in an executable between at least two heterogeneous processors comprising a first processor and a second processor, in a system having separate execution environments comprising a first execution environment and a second execution environment, comprising the steps of:
    assigning the at least one global information to a first address in the first execution environment associated with the first processor, wherein at least the second processor cannot address the first execution environment;
    assigning the at least one global information to a second address in the second execution environment associated with the second processor, wherein the first address and the second address are different; and
    storing an external symbol dictionary on the first and second execution environments to map the at least one global information stored at the first address to the at least one global information stored at the second address, wherein the external symbol dictionary comprises an indicia of the at least one global information, an indicia of the first address in the first execution environment, and an indicia of the second address in the second execution environment.

8. The method of claim 7, wherein the indicia of the first address comprises an identifier of the first processor plus the first address, and the indicia of the second address comprises an identifier of the second processor plus the second address.

9. The method of claim 7 further comprising storing a copy of the external symbol dictionary in the first execution environment and the second execution environment.

10. The method of claim 7 further comprising storing a copy of an object code module intended to be executed by the first processor in the first execution environment, and a copy of an object code module intended to be executed by the second processor in the second execution environment.

11. The method of claim 7, wherein the external symbol dictionary comprises only a name, the first address, and the second address.

12. The method of claim 7, wherein the external symbol dictionary comprises only a length of the at least one global information, a name, the first address, and the second address.

13. A computer program product for creating an integrated executable program, having at least one global information, to be executed on a system having at least two heterogeneous processors comprising a first processor and a second processor, and at least two separate execution environments comprising a first execution environment and a second execution environment, with the computer program product having a medium with a computer program embodied thereon, wherein the computer program comprises:

computer code for separately compiling a plurality of source code modules, each intended to be executed on one of either the first execution environment or the second execution environment, wherein at least two modules of the plurality of source code modules reference the at least one global information, the compiling creating separate object code modules;

computer code for assigning the at least one global information to a first address in the first execution environment, wherein at least one processor of the at least two heterogeneous processors cannot address the first execution environment;

computer code for assigning the at least one global information to a second address in the second execution environment, wherein the first and second addresses are different;

computer code for generating an external symbol dictionary to map the first address to the second address, wherein the external symbol dictionary comprises an indicia of the global information, the first address of the first execution environment, and the second address of the second execution environment; and computer code for linking the object code modules and the external symbol dictionary to create an integrated executable program.

14. A computer program product for mapping at least one global information in an executable between at least two heterogeneous processors comprising a first processor and a second processor, in a system having separate execution environments comprising a first execution environment and a second execution environment, with the computer program product having a medium with a computer program embodied thereon, wherein the computer program comprises:

computer code for assigning the at least one global information to a first address in the first execution environment associated with the first processor, wherein at least the second processor cannot address the first execution environment;

computer code for assigning the at least one global information to a second address in a second execution environment associated with the second processor, wherein the first address and second address are different; and computer code for storing an external symbol dictionary on the first and second execution environments to map the at least one global information stored at the first address to the at least one global information stored at the second address, wherein the external symbol dictionary comprises an indicia of the at least one global information, an indicia of the first address in the first execution environment, and an indicia of the second address in the second execution environment.

* * * * *